Patented June 13, 1944

2,351,160

UNITED STATES PATENT OFFICE 2,351,160

ART OF REGENERATING ZEOLITES

Norman G. Stone, Canton, and Samuel W. Holliday, Greentown, Ohio, assignors to The Dacar Chemical Products Company, Pittsburgh, Pa., a corporation of Ohio No Drawing. Application March 4, 1943,
Serial No. 478,050

13 Claims. (Cl. 23—112)

The invention relates generally to water softening by using zeolites, and more particularly to a novel compound for regenerating zeolites and an improved method of carrying out the regenerating operation.

In conventional water softeners utilizing zeolites, which may be natural or synthetic and in crystalline or jelled condition, the hard water is run through the zeolite which has the well known property of softening the water by exchanging sodium for the calcium and magnesium in the salts of calcium and magnesium which render the water hard. When the zeolite is exhausted, that is, substantially all transformed from a sodium zeolite to a calcium and magnesium zeolite, it loses its softening effect and must be regenerated by treatment with a brine solution of common salt which restores the sodium.

Common practice is to regenerate before the zeolite is exhausted by first back washing the zeolite briefly by reversing the flow of water therethrough, then introducing a measured quantity of salt brine into the zeolite bed, and then rinsing out the waste salts by running raw water through the bed.

However, each regeneration consumes a substantial amount of salt and after a period of use the zeolite bed is not restored to its original efficiency, or in other words is not fully regenerated by the salt brine treatment, especially where the water being treated contains iron and sulphur, because these impurities form deposits on the zeolite which are not removed to any material extent by the salt brine treatment.

Accordingly, after the zeolite has been used for a considerable time, more and more frequent regenerating is required or more and more salt brine is necessary with each regeneration in order partially to remove the deposits of such impurities on the zeolites; and finally it becomes necessary or highly desirable to replace the zeolite, because of the increased time and expense of regenerating.

We have discovered and developed an improved method of regenerating zeolites in water softening systems by using a novel compound in the ordinary salt brine for regenerating. This novel compound not only takes the place of a part of the salt in exchanging the calcium and magnesium of the salt deposits on the zeolite, but also acts to remove the deposits of other impurities such as iron and sulphur, thus increasing the efficiency of the zeolite to substantially its original efficiency.

Thus, materially less salt per regeneration is required, fewer regenerations are necessary, and the life of the zeolite is greatly increased.

Various chemical compounds have been proposed for softening water, and for preventing or removing scale and calcareous deposits. To our knowledge no one has successfully used a chemical compound of the nature of our novel compound in the ordinary salt brine used for regenerating zeolites in water softening systems.

It is therefore an object of the present invention to provide a novel compound for regenerating zeolites which is adapted to be used in the conventional salt brine regenerating solution.

Another object is to provide a novel zeolite regenerating compound which takes the place of a large part of the salt brine.

A further object is to provide a novel zeolite regenerating compound for use in salt brine which acts to remove not only calcium and magnesium salts but also iron and sulphur deposits from the zeolite.

Another object is to provide a novel regenerating compound for zeolites which acts to restore the zeolite to substantially its original water softening efficiency.

A still further object is to provide an improved method of regenerating zeolites by adding a novel compound to the salt brine used for regenerating.

And finally it is an object of the present invention to provide a simple and economical method of regenerating zeolites.

These and ancillary objects are attained by the improved methods, and the novel combinations and sub-combinations of ingredients constituting the novel compound comprising the present invention, which is hereinafter described in detail and defined in the appended claims.

The novel zeolite regenerating compound which we have discovered consists of the following essential ingredients in proportions within the ranges given:

| Ingredient | Unit | Amount |
|---|---|---|
| Sodium bicarbonate; about | ounce | 1 |
| Potassium carbonate | pounds | 4 to 7 |
| Trisodium phosphate (chemically pure) | do | ½ to 2½ |
| Sodium metaphosphate | ounces | 1 to 2 |
| Caustic soda | do | 1 to 1½ |

These ingredients are mixed together in dry form and then dissolved in about 1 gallon of water which is at a temperature of 200° to 212° F.

While good results are obtained by varying the proportions within the limits given above, we prefer to use approximately the following proportions:

| | | |
|---|---|---|
| Sodium bicarbonate | ounce | 1 |
| Potassium carbonate | pounds | 5 |
| Trisodium phosphate (C. P.) | do | 1 |
| Sodium metaphosphate | ounce | 1 |
| Caustic soda | do | 1 | dissolved in 1 gallon of water at 200° to 212° F.

We also prefer to add about 1 ounce of sodium silicate to these ingredients before dissolving in hot water, because we have found that the sodium silicate appears to aid in restoring the softening efficiency of the zeolite, although very good results may be obtained without adding the sodium silicate.

In using our novel compound the solution thereof is merely added to the ordinary salt brine used for regenerating, and we have found that 1 pint of solution is equivalent to about 100 pounds of salt. Thus where a softening system includes a brine tank having a capacity of 200 pounds of salt, we use 100 pounds of salt and 1 pint of our novel compound.

We have found in actual practice that by using our novel compound in ordinary salt brine, not only is the compound equivalent to part of the salt as a regenerator of the zeolite, but the combination of salt and compound restores the zeolite to substantially its original softening efficiency, so that the same amount of salt and compound can be used for each regeneration at uniform regenerating periods to produce zero soft water over long periods of time.

We have found also that while the compound as prepared is alkaline in character, when used with salt brine in a zeolite system it has no alkaline effect upon the soft water obtained from the system.

Moreover, where a zeolite system has been used for a relatively long time and an increased amount over the original required amount of salt is required to regenerate the zeolite sufficiently to obtain zero soft water, we have found that by substituting for part of the salt our compound in the proportions given above, after two or three regenerations zero soft water may be obtained by using less brine and less compound to an extent closely approaching the equivalent of the original salt required.

Referring to a specific example, a zeolite softening system treating water of 26 grains hardness originally required 10 pounds of salt to regenerate for obtaining 830 gallons of zero soft water. After two years of use, 13½ pounds of salt was required to obtain only 675 gallons of zero soft water. By using 5 pounds of salt and 1/20 pint of our novel compound, the first regeneration gave 788 gallons of zero soft water, and the second regeneration using the same amounts gave 975 gallons of zero soft water.

Thus, in the particular example referred to, by using our novel compound in the salt brine for several runs, the zeolite appeared to have even greater softening efficiency than when it was new and regenerated with salt brine alone.

While we do not fully understand the chemical reactions involved in using our novel compound in salt brine to regenerate zeolites, we believe that the potassium carbonate and trisodium phosphate react to remove calcium, magnesium and other deposits from the zeolite; the caustic soda aids in removing the iron and sulphur deposits; the sodium metaphosphate acts as a flocculator to keep particles of the deposits in suspension until they are rinsed away as waste; and the sodium bicarbonate acts to prevent crystallization of the potassium carbonate, trisodium phosphate and sodium metaphosphate. Since sodium silicate when used appears to improve the softening efficiency of the zeolite, it apparently also aids in removing iron and sulphur deposits.

We are aware that several of the ingredients of our novel compound have been used singly and in combination for removing various deposits including scale and calcareous deposits, but to our knowledge such ingredients have never been successfully used in a brine solution for regenerating zeolites, and especially not the particular combination of ingredients comprising our novel compound.

We claim:

1. A zeolite regenerating compound for use in salt brine consisting of an aqueous solution of sodium bicarbonate, potassium carbonate, trisodium phosphate, sodium metaphosphate and caustic soda.

2. A zeolite regenerating compound for use in salt brine consisting of an aqueous solution of sodium bicarbonate, potassium carbonate, trisodium phosphate, sodium metaphosphate, caustic soda and sodium silicate.

3. A zeolite regenerating compound for use in salt brine consisting of about 1 ounce sodium bicarbonate, 4 to 7 pounds potassium carbonate, ½ to 2½ pounds trisodium phosphate, 1 to 2 ounces sodium metaphosphate, and 1 to 1½ ounces caustic soda.

4. A zeolite regenerating compound for use in salt brine consisting of about 1 ounce sodium bicarbonate, 4 to 7 pounds potassium carbonate, ½ to 2½ pounds trisodium phosphate, 1 to 2 ounces sodium metaphosphate, 1 to 1½ ounces caustic soda and about 1 ounce sodium silicate.

5. A zeolite regenerating compound for use in salt brine consisting of about 1 ounce sodium bicarbonate, 4 to 7 pounds potassium carbonate, ½ to 2½ pounds trisodium phosphate, 1 to 2 ounces sodium metaphosphate, and 1 to 1½ ounces caustic soda dissolved in one gallon of water at 200° to 212° F.

6. A zeolite regenerating compound for use in salt brine consisting of about 1 ounce sodium bicarbonate, 4 to 7 pounds potassium carbonate, ½ to 2½ pounds trisodium phosphate, 1 to 2 ounces sodium metaphosphate, 1 to 1½ ounces caustic soda and about 1 ounce sodium silicate dissolved in one gallon of water at 200° to 212° F.

7. A zeolite regenerating compound for use in salt brine consisting of the following approximate proportions of ingredients: 1 ounce sodium bicarbonate, 5 pounds potassium carbonate, 1 pound trisodium phosphate, 1 ounce sodium metaphosphate, and 1 ounce caustic soda.

8. A zeolite regenerating compound for use in salt brine consisting of the following approximate proportions of ingredients: 1 ounce sodium bicarbonate, 5 pounds potassium carbonate, 1 pound trisodium phosphate, 1 ounce sodium metaphosphate, 1 ounce caustic soda and 1 ounce sodium silicate.

9. A zeolite regenerating compound for use in salt brine consisting of the following approximate proportions of ingredients dissolved in about 1 gallon of water at 200°–212° F.: 1 ounce sodium bicarbonate, 5 pounds potassium carbonate, 1 pound trisodium phosphate, 1 ounce sodium metaphosphate, and 1 ounce caustic soda.

10. A zeolite regenerating compound for use in salt brine consisting of the following approximate proportions of ingredients dissolved in about 1 gallon of water at 200°–212° F.: 1 ounce sodium bicarbonate, 5 pounds potassium carbonate, 1 pound trisodium phosphate, 1 ounce sodium metaphosphate, 1 ounce caustic soda, and 1 ounce sodium silicate.

11. The method of regenerating zeolite in a water softening system, which includes introducing into the zeolite a salt brine solution to which has been added a solution containing sodium bicarbonate, potassium carbonate, trisodium phosphate, sodium metaphosphate and caustic soda.

12. The method of regenerating zeolite in a water softening system, which includes introducing into the zeolite a salt brine solution to which has been added a compound containing the following approximate proportions of ingredients: 1 ounce sodium bicarbonate, 5 pounds of potassium carbonate, 1 pound trisodium phosphate, 1 ounce sodium metaphosphate, and 1 ounce caustic soda.

13. The method of regenerating zeolite in a water softening system, which includes the steps of adding to the regenerating salt brine a compound having the following approximate proportions of ingredients dissolved in one gallon of hot water: 1 ounce sodium bicarbonate, 5 pounds potassium carbonate, 1 pound trisodium phosphate, 1 ounce sodium metaphosphate, and 1 ounce caustic soda; and then introducing the brine and compound into the zeolite.

NORMAN G. STONE.
SAMUEL W. HOLLIDAY.